United States Patent [19]
Gillespie

[11] Patent Number: 5,467,948
[45] Date of Patent: Nov. 21, 1995

[54] APPARATUS FOR RETAINING COOLING PIPES FOR AN ICE RINK

[76] Inventor: Duncan S. Gillespie, 434 S. Marks St., Thunder Bay, Ont., P7E1M5, Canada

[21] Appl. No.: 265,952

[22] Filed: Jun. 27, 1994

[51] Int. Cl.⁶ .................................................. F16M 13/00
[52] U.S. Cl. .............................. 248/68.1; 248/49; 248/175
[58] Field of Search ................................ 248/68.1, 74.2, 248/49, 57, 175, 73

[56] References Cited

U.S. PATENT DOCUMENTS

| | | |
|---|---|---|
| 2,038,912 | 4/1936 | Summers . |
| 2,198,529 | 4/1940 | Fields ................... 248/68.1 X |
| 2,819,858 | 1/1958 | Mittendorf .............. 248/74.2 |
| 2,830,799 | 4/1958 | Amerio .................. 248/68.1 X |
| 2,972,460 | 2/1961 | Kenyon .................. 248/68.1 X |
| 2,997,770 | 8/1961 | Beltz . |
| 3,285,334 | 11/1966 | Pasternak . |
| 3,641,782 | 2/1972 | Timms . |
| 4,577,435 | 3/1986 | Springer et al. ......... 248/68.1 X |
| 4,616,486 | 10/1986 | Ohashi .................. 248/68.1 X |
| 4,621,682 | 11/1986 | Jennings et al. ......... 248/68.1 X |
| 4,671,347 | 6/1987 | MacCracken ............. 248/74.2 X |
| 4,709,556 | 12/1987 | Hupfer .................. 248/68.1 X |
| 5,085,384 | 2/1992 | Kasubke ................. 248/74.2 X |

FOREIGN PATENT DOCUMENTS

| | | |
|---|---|---|
| 1183358 | 3/1985 | Canada . |
| 1261158 | 9/1989 | Canada . |
| 1307933 | 9/1992 | Canada . |

*Primary Examiner*—Karen J. Chotkowski
*Attorney, Agent, or Firm*—Mila Shvartsman

[57] ABSTRACT

The present invention is related to an apparatus for retaining cooling pipes employed in an ice rink on a floor supporting the rink. The apparatus comprising a plurality of pipe support sections or chairs to be disposed on the floor of the rink. Each of pipe support section comprises a base plate adapted to rest on the floor surface, at least one pipe retaining element integrally connected to the base plate and projecting vertically therefrom at the position over and above the floor surface. An upper portion of the pipe retaining element being provided with a pipe locking means adapted releasably lock the cooling pipe, a bar supporting element integrally connected to the pipe retaining element. This bar supporting element being spaced on predetermined distance between the base plate and the upper portion of pipe retaining element. Bar supporting element being adapted to support a plurality of reinforcement bars. Reinforcement bars are provided to support said pipes and to reinforce the complete ice rink structure, said pipe support sections being made of a rigid material, such as steel or the like.

14 Claims, 3 Drawing Sheets

APPARATUS FOR RETAINING COOLING PIPES FOR AN ICE RINK

The present invention relates to an apparatus for retaining the cooling pipes of an ice rink or the like, which is disposed on the floor of the rink.

There is known CP 1,261,158 related to an apparatus for retaining cooling pipes employed in the ice rink on the floor supporting the rink comprising at least one belt-shaped base member to be disposed on the floor, a supporting member integrally formed with the base member to project vertically therefrom, wherein said supporting member including fitting engagement portions for retaining cooling pipes, said retaining apparatus is made of flexible synthetic resin.

There also known CP 1,307,933 related to an apparatus for making and maintaining the ice surface comprising a plurality of elongated sheet modules made of a flexible synthetic resin including elongated membrane, a plurality of equally-spaced parallel webs and a tube integrally connected to the longitudinal edge of each web.

Further there is known CP 1,183,358 related to an apparatus for making and maintaining the ice surface comprising a plurality of elongated strips extending longitudinally made of a flexible extruded plastic member including a plurality of spaced-apart interspaced by integral web portions.

There is also known an apparatus for retaining cooling pipes employed on the ice ring comprising a plurality of pipe supporting sections each having a base plate and a number upstanding prongs for retaining a plurality of cooling pipes, which are retained by means of wire ties individually tied by a team of 8–10 people. The main disadvantage of this arrangement was a possibility of the pipes to be punctured by wire ties customarily used to tie the tubing into the pipe retaining sections or chairs. Besides, the entire operation of installing the complete ice rink cooling system (52,000 pipes) would usually takes 10 people and 2 ½ days.

The proposed improved apparatus reduces the chance of the pipes being punctured by the wire ties and will make the pipe installation process less labour intensive, since with this improved process it requires 5 people and 2 days to install the complete piping.

SUMMARY OF THE INVENTION

Broadly the present invention is related to an apparatus for retaining cooling pipes employed in an ice rink on a floor supporting the rink;

the apparatus comprising:

a plurality of pipe support sections or chairs to be disposed on the floor of the rink;

each of said pipe support section comprises:

a base plate adapted to rest on the floor surface;

at least one pipe retaining element integrally connected to said base plate and projecting vertically therefrom at the position over and above the floor surface, an upper portion of said pipe retaining element being provided with a pipe locking means adapted releasably lock said cooling pipe;

a bar supporting element integrally connected to said pipe retaining element, said bar supporting element being spaced on predetermined distance between said base plate and the upper portion of said pipe retaining element;

said bar supporting element being adapted to support a plurality of reinforcement bars, wherein said reinforcement bars are provided to support said pipes and to reinforce the complete ice rink structure;

said pipe support sections being made of a rigid material, such as steel or the like;

said cooling pipes retained in said pipe retaining elements being further connected to a freezing liquid header means.

Said pipe support section having a predetermined number of said pipe retaining elements spaced apart in a row longwise of said base plate.

Said locking means of said pipe retaining elements being adapted to releasably retain said cooling pipes by means of resilient force of their inner walls.

Each of said pipe retaining elements comprises a pair of prongs with their upper ends slightly bent towards each other to facilitate releasable clasping or snapping into said cooling pipes.

Said bar support element being substantially parallel to said base plate. Each of said pipe support section provided with an attachment means adapted to keep plurality of said sections in a stable configuration. Said attachment means comprises an eye-hook arrangement being mounted on the opposite ends of said pipe support section respectively.

Still another embodiment of the present invention comprises a pipe support section or chair comprising:

a base plate adapted to rest on the ice-rink floor surface;

at least one pipe retaining element integrally connected to said base plate and projecting vertically therefrom at the position over and above the floor surface, an upper portion of said pipe retaining element being provided with a cooling pipe locking means adapted to releasably lock said cooling pipe;

a bar supporting element integrally connected to said pipe retaining element, said bar supporting element being spaced on predetermined distance between said base plate and the upper portion of said pipe retaining element;

said bar supporting element being adapted to support a plurality of reinforcement bars provided to support said pipes and to reinforce the complete ice rink structure;

said pipe support sections being made of a rigid material, such as steel or the like;

BRIEF DESCRIPTION OF THE DRAWINGS

The above will be more clearly understood by having referral to the referred embodiment of the invention, illustrated by the way of the accompanying drawings, in which.

DETAILED DESCRIPTION OF THE PREFERRED EMBODIMENT

Figure 1:
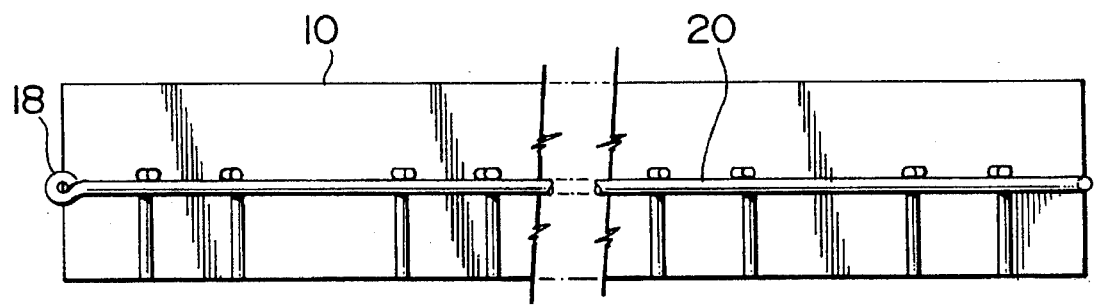
FIG. 1 is a broken plan view of a pipe support section of the apparatus according to the invention for sand floor.
Figure 2:
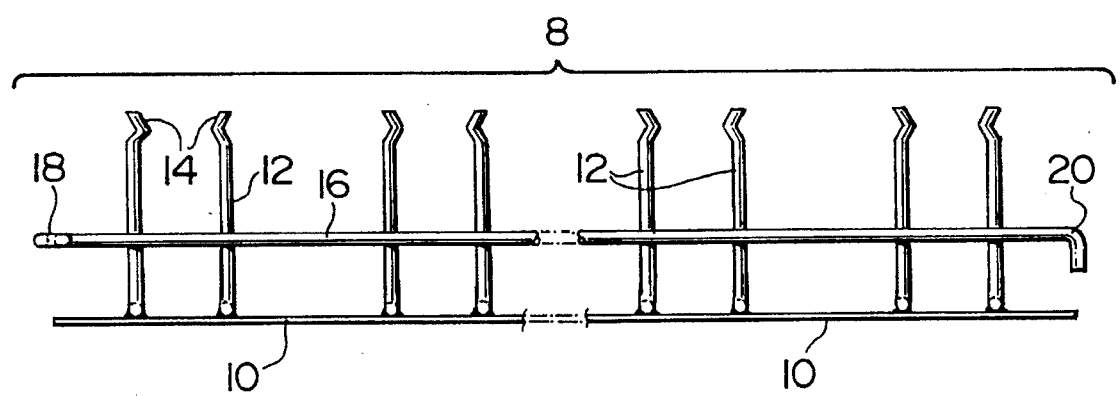
FIG. 2 is a broken side view of the pipe support section.
Figure 3:
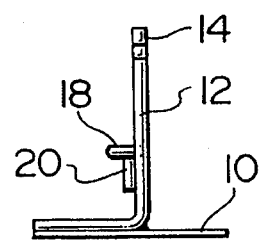
FIG. 3 is an end view of the pipe support section.

Referring now to FIGS. 1 to 3 there is shown the pipe support section or chair 8 comprising a base plate 10 provided to carry the complete pipe assembly. Preferably the base or gauge plate 10 is made of steel.

A number of pipe retaining elements or prongs 12 are integrally connected to the plate 10 and projecting vertically therefrom at the position over and above the floor surface. Preferably but not necessary prongs 12 have L-shaped configuration as shown at FIG. 3. The lower part of those prongs are integrally connected to the base plate 10 by means of welding. The upper ends of prongs 12 identified as 14 are slightly bent towards each other thus to releasably retain the cooling pipes by means of resilient force of their inner walls. This way tubing can be clasped or snapped into the pipe retaining prongs of the support section 8 eliminating any need of wire ties as it was used in Prior art arrangement shown on FIG. 8. The main advantage of the present improvement is a less labour intensive pipe installation which reduces the chances of the pipes being punctured by wire ties customary used to tie the tubing into the pipe chair.

A predetermined number of said pipe retaining prongs 12 are spaced apart in a row longwise the base plate 10 and are integrally connected to a bar supporting element 16. This element 16 is spaced on a predetermined distance between plate 10 and upper ends of prongs 14 and is substantially parallel to base plate 10. The bar supporting element 16 is adapted to carry a plurality of crosswise reinforcement bars 22 and lengthwise reinforcement bars 24, which in turn provided to support a plurality of cooling pipes 26. Those reinforcement bars 22 and 24 also provided to reinforce the floor of the complete assembly.

Each pipe support section or chair is connected to each other by attachment means such as eye 18 and hook 20 arrangement located on the opposite ends of the bar supporting element 16. The purpose of this eye-hook arrangement is to keep the chairs in place while said reinforcement bars 22, 24 and pipes 26 are being put in place.

The materials used in the manufacture of the chair 8 are strong metals, such as gauge plate and 3/16 inch steel rod. No other materials, such as plastic or wood would be acceptable.

Figure 4:
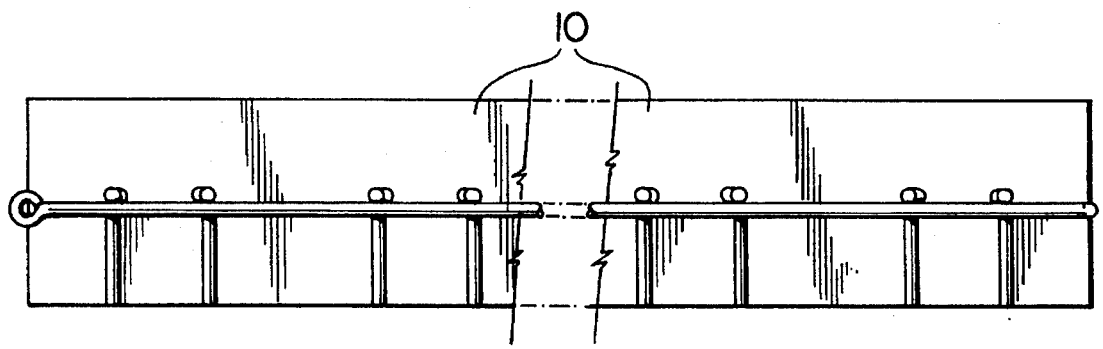
FIG. 4 is a broken plan view a pipe support section installed on the concrete floor.
Figure 5:
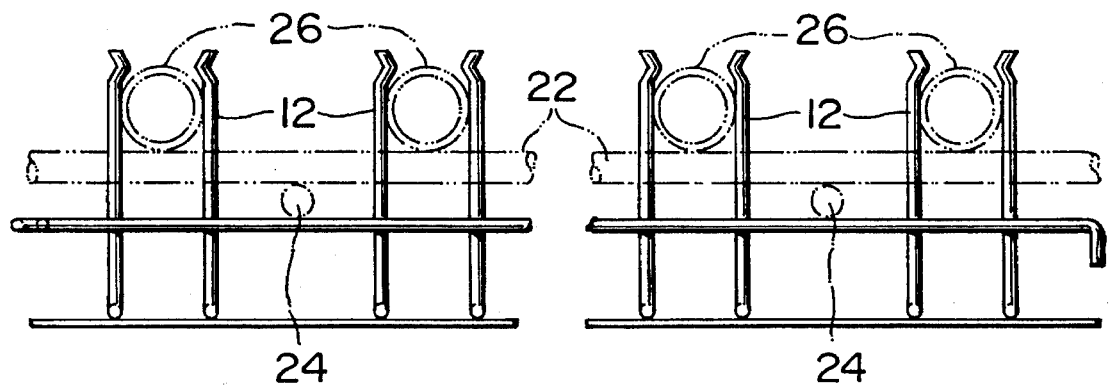
FIG. 5 is a broken side view of FIG. 4 showing assembled section with reinforcement bars and pipes.
Figure 6:
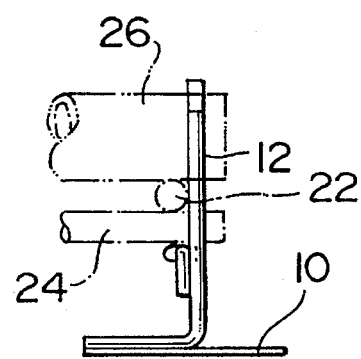
FIG. 6 is a end view of FIG. 4.

FIGS. 4 to 6 shows a pipe supporting section 8 used on the concrete floor and is similar to those shown on FIGS. 1–3. The only difference between the sand floor chairs is the height of prongs 14, and the snap in configuration remains the same. The chairs used for concrete floors has a maximum height of 3 ½ inches. Whereas 90% of floors are 5 inches thick, this gives approximately 1 ½ inches of concrete over the tubing. In a sand configuration the maximum height of the chair 8 is 1 ½ inches wherein the tubing is covered with approximately 1 ½ inches of sand.

For the concrete floor modification the suggested width of base plate 10 is 3 inches and prongs 12 are mounted alongside the center line at 1 ½ inches from each side. The bar supporting element 16 is connected to prongs 12 around 1 ½ inches above the plate 10.

The distance between each pair of prongs is also 1 ¼ inches and the distance between each set of prongs is 4 inches. The length of each support section is around 5 feet and there is an eye 18 and hook 20 on the opposite ends of said section to hook a plurality of those sections together when they are placed on the floor, which facilitates easier installment of reinforcement bars and pipes. The base plate is not anchored to the floor and is a part of free standing structure. The distance between each row of support sections or chairs 8 is approximately 3 feet. The pipe chair design is for seasonal (on sand floor) or long term use (on concrete floor). Reinforcement bars 22 and 24 are not an integral part of the chair 8. Preferably it is a round rod ½ inch in diameter and 20 feet long. Said bars rest between the 4 inch spacing on the chair's bar supporting elements 16, but not inside the pipe retaining elements or prongs 12. Said bars 22 and 24 are placed on the rink floor at 16 inch centres lengthwise and 12 inches crosswise.

Figure 7:
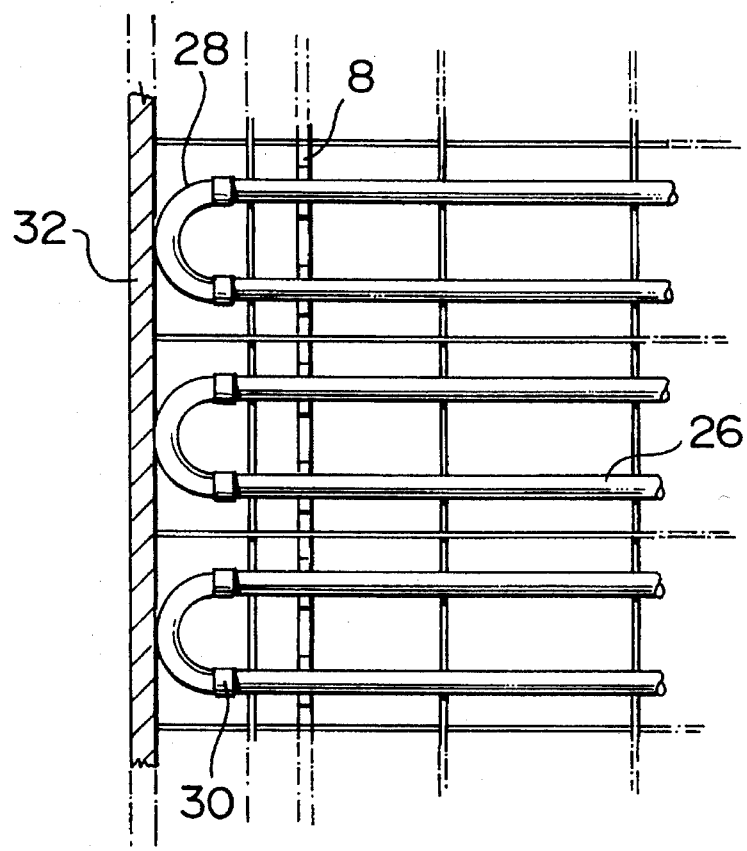
FIG. 7 is a fragment plan view on the ice rink showing the assembled pipe supporting system including return bends with hose clamps.

Now turning to the procedure of assembling the complete ice rink structure wherein the improved design of the pipe support section or chair 8 is employed. First of all the foundation of the ice rink is put in place and an under slab (sub floor) heating system is installed to eliminate the possibility of perma-frost. Once the sub-floor grid is installed (see FIG. 8) it is covered with sand 34 and further with 2 layers of styrofoam insulation 36. After this is completed, a layer of 6 mm poly vapour barrier 38 is placed over the entire surface. Once this step is completed pipe chairs 8 are placed crosswise on the slab at 3 inch intervals. Around the perimeter of the ice rink on edge (see FIG. 7) is placed an expansion joint 32 which allows the slab to move independently from the perimeter concrete, should there be any movements due to expansion or contraction. At this point of construction the reinforcement bars 22 and 24 are placed on chairs 8, first at 18 inch centers lengthwise of the floor and then at 12 inch centers crosswise of the floor. At this time the cooling pipes 26 are placed into each pipe retaining element or prongs 12 by means of snapping inside the upper ends 14 of said prongs 12. Once the tubing is in place, its ends are connected to the header (not shown) by means of a return bends 28 and hose clamps 30. After the complete connection is done and tested, the entire area is covered with a gauge steel mesh 40 and a top slab 42 is then poured to a depth of 5 inches. In this structure, the reinforcement bars 22 and 24 help to support the tubing and also to reinforce the complete floor structure.

Figure 8:
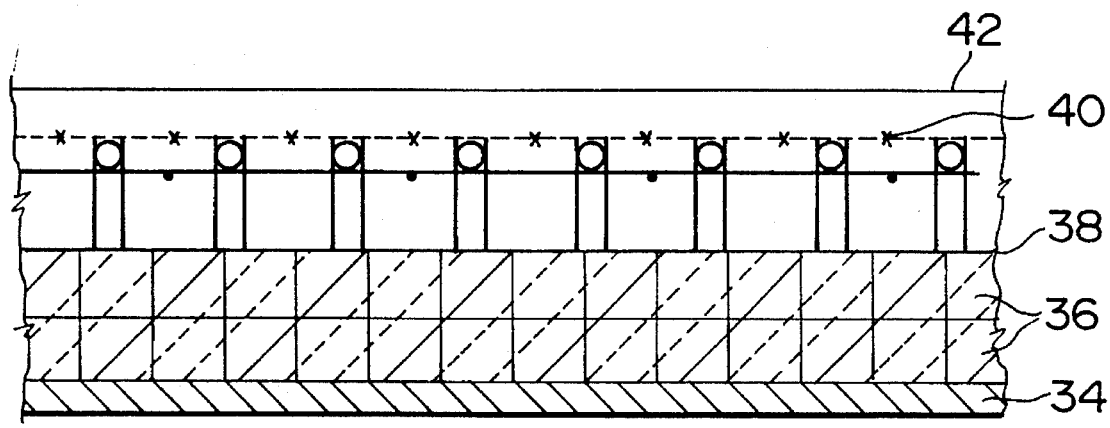
FIG. 8 is a Prior art pipe support system using wire ties.

The design of the snap lock chair 8 as described in the present invention, was arrived at after many years of using the drop in type of the chair as shown on FIG. 8. With the drop in chair, it took from 8 to 10 people and 2 to 2 ½ days to wire tie the entire amount of tubing required for a rink (52,000 pipes). Using the improved structure of the pipe chair it requires only 5 people and 2 days to install the same amount of piping.

Since various modifications can be made to my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An apparatus for retaining cooling pipes employed in an ice rink on a floor supporting the rink;

the apparatus comprising:
   a plurality of pipe support sections or chairs to be disposed on the floor of the rink;
each of said pipe support section comprises:
   a base plate adapted to rest on the floor surface;
   at least one pipe retaining element integrally connected to said base plate and projecting vertically therefrom at the position over and above the floor surface,
   an upper portion of said pipe retaining element being provided with a pipe locking means adapted releasably lock said cooling pipe;
   a bar supporting means for supporting a plurality of reinforcement bars, wherein said reinforcement bars are provided to support said pipes and to reinforce the complete ice rink structure;

said bar supporting means integrally connected to said pipe retaining element, said bar supporting means being spaced on predetermined distance between said base plate and the upper portion of said pipe retaining element;

said pipe support sections being made of a rigid material, such as steel or the like;

said cooling pipes retained in said pipe retaining elements being further connected to a freezing liquid header means.

2. An apparatus as in claim 1 wherein said pipe support section having a predetermined number of said pipe retaining elements spaced apart in a row longwise of said base plate.

3. An apparatus according to claim 2 wherein said locking means of said pipe retaining elements being adapted to releasably retain said cooling pipes by means of resilient force of their inner walls.

4. An apparatus according to claim 3 wherein each of said pipe retaining elements comprises a pair of prongs with their upper ends slightly bent towards each other to facilitate releasable clasping or snapping into said cooling pipes.

5. Apparatus according to claim 2 wherein said bar supporting means being substantially parallel to said base plate.

6. Apparatus according claim 2 wherein each of said pipe support section provided with an attachment means adapted to keep plurality of said sections in a stable configuration.

7. Apparatus according to claim 6 wherein said attachment means comprises an eye-hook arrangement being mounted on the opposite ends of said pipe support section respectively.

8. Pipe support section or chair comprising:

a base plate adapted to rest on the ice-rink floor surface;

at least one pipe retaining element integrally connected to said base plate and projecting vertically therefrom at the position over and above the floor surface, an upper portion of said pipe retaining element being provided with a cooling pipe locking means adapted to releasably lock said cooling pipe;

a bar supporting means for supporting a plurality of reinforcement bars provided to support said pipes and to reinforce the complete ice rink structure;

said bar supporting means integrally connected to said pipe retaining element, said bar supporting element being spaced on predetermined distance between said base plate and the upper portion of said pipe retaining element;

said pipe support sections being made of a rigid material, such as steel or the like.

9. Pipe support section as in claim 8, wherein said pipe support section having a predetermined number of said pipe retaining elements spaced apart in a row longwise of said base plate.

10. Pipe support section according to claim 9, wherein said locking means of said pipe retaining elements being adapted to releasably retain said cooling pipes by means of resilient force of their inner walls.

11. Pipe support section according to claim 10, wherein each of said pipe retaining elements comprises a pair of prongs with their upper ends slightly bent towards each other to facilitate releasable clasping or snapping into said cooling pipes.

12. Pipe support section according to claim 9, wherein said bar support means being substantially parallel to said base plate.

13. Pipe support section according claim 9, wherein each of said pipe support sections provided with an attachment means adapted to keep plurality of said sections in a stable configuration.

14. Pipe support section according to claim 13, wherein said attachment means comprises an eye-hook arrangement being mounted on the opposite ends of said pipe support section respectively.

\* \* \* \* \*